United States Patent [19]

Ferrel

[11] Patent Number: 4,747,587
[45] Date of Patent: May 31, 1988

[54] LOW PROFILE SUSPENSION STRUT

[75] Inventor: Terry J. Ferrel, Rochester Hills, Mich.

[73] Assignee: Chrysler Motors Corporation, Highland Park, Mich.

[21] Appl. No.: 4,392

[22] Filed: Jan. 15, 1987

[51] Int. Cl.$^4$ ............................................. B60G 15/00
[52] U.S. Cl. ..................................... 267/220; 267/32; 267/35; 267/219; 267/257; 267/258; 267/292; 267/293; 280/668
[58] Field of Search ................. 267/219, 220, 35, 292, 267/293, 32, 52, 257, 258; 280/668

[56] References Cited

U.S. PATENT DOCUMENTS

| | | | |
|---|---|---|---|
| 3,165,306 | 1/1965 | Tea | 267/220 |
| 3,412,990 | 11/1968 | Gladstone | 267/220 |
| 4,397,452 | 8/1983 | Fouts | 267/220 |
| 4,462,608 | 7/1984 | Lederman | 267/220 |
| 4,474,363 | 10/1984 | Numazawa et al. | 267/220 |
| 4,531,759 | 7/1985 | Rezanka et al. | 280/668 |
| 4,555,096 | 11/1985 | Pryor | 267/220 |

Primary Examiner—Andres Kashnikow
Assistant Examiner—Mark T. Le
Attorney, Agent, or Firm—Edward P. Barthel

[57] ABSTRACT

An improved automotive suspension strut isolator and jounce bumper upper mount providing a compact resilient assembly adaptable for a vehicle having a reduced hood line. The assembly comprises a collar member formed with an upstanding collar portion having a radially outwardly extending contact flange. An inverted cylindrical cup member is positioned in spaced relation with the collar separated by an elastomeric isolator. The cup member includes a return bend flange underlying the contact flange in an axially spaced manner. The cup member is sized to telescopically accommodate the upper end of the strut outer support casing at full jounce travel thereby lowering the overall strut height for a given vehicle attachment span. In one form of the invention the strut utilizes a convoluted dust shield as a jounce bumper.

2 Claims, 3 Drawing Sheets

LOW PROFILE SUSPENSION STRUT

BACKGROUND OF THE INVENTION

This invention relates to automotive suspensions and more particularly to a new and improved hydraulic shock absorbing suspension strut wherein the total overall length of the unit is minimized providing a reduced vehicle hood line.

It has long been known that strut type oscillation dampening shock absorbers are employed in downsized vehicles to provide increased space for the engine and transmission within the vehicle front compartment. Examples of such shock absorbers are shown in U.S. Pat. No. 4,046,403 issued Sept. 6, 1977 to Yoshido and U.S. Pat. No. 4,482,135 issued Nov. 13, 1985 to Ishida et al.

SUMMARY OF THE INVENTION

In accordance with the present invention, there is provided a shock absorbing strut adapted for use in a vehicle independent suspension comprising an upright strut apparatus having a strut outer support casing enclosing a shock absorber. An inner cylinder, fixed in the support casing, has a hydraulic dampening fluid therein. A valved piston is mounted in the cylinder for sliding reciprocal movement relative thereto and includes a piston rod operatively connected to the piston. The piston rod, extending through the upper end of the cylinder and support casing, has its upper end fixed to an upper mounting assembly attached to a sprung body portion of the vehicle. The upper mounting assembly comprises a collar member having an upstanding annular collar portion extending through an opening in the vehicle sheet metal body. The collar lower end is formed with a radially outwardly extending contact flange adapted for attachment to the vehicle sprung mass such as the underside of the sheet metal body structure.

The upper mounted seat assembly includes an inverted cylindrical cup member having an upper closed end body portion and a lower open end neck portion. The cup upper body portion is positioned in concentrically spaced relation within the collar portion defining an annular space therebetween. The cup upper body portion and lower neck portion are joined by an integral reverse-bend stop flange. The stop flange extends radially so as to underlie a portion of the collar flange in an axially spaced manner with the vehicle in its statically loaded state. A flexible elastomeric cylindrical shaped isolator is bonded intermediate the outer collar portion and inner cup body portion. A convoluted elastomeric sleeve, having its upper end fixed to the cup neck portion, extends axially a predetermined distance so as to surround the upper end of the strut outer casing with the suspension strut supporting the vehicle in its statically loaded state.

The cup member is diametrically and axially sized to telescopically accommodate the upper end of the outer support casing for dictated amounts of stroke during oscillation dampening caused by wheel jounce and rebound. As the oscillating deflections or jounce travel increases an outer support casing, in one form of the invention, includes a contact ring which engages the convoluted sleeve. The sleeve convoluted portion yields until the sleeve has folded upon itself for initial loading between the contact ring and the cup member stop flange thus providing jounce bumper cushioning of the strut. For maximum jounce travel the folded sleeve is compressed intermediate the support casing contact ring and the cup member stop flange causing axial resilient deformation of the elastomeric isolator. In the event the isolator is subjected to excessive axial displacement the cup member stop flange will abut the collar flange. This feature provides a predetermined axial travel stop limiting the upward displacement of the isolator. At the strut's minimum compressed height the support casing upper end is designed to contact the cup member closed end prior to the convoluted sleeve being excessively deformed and overstressed between the contact ring and stop flange.

In an alternative embodiment of the invention an elastomeric jounce bumper, formed of resiliently compressible plastic foam, surrounds the upper end of the piston rod and is bonded to the cap member upper closed end. It will be noted that in this embodiment a convoluted elastomeric tube is connected between the cup member and the support casing while functioning solely as a protective dust shield.

A feature of the present invention is to significantly lower the overall height of a hydraulic shock absorbing suspension strut at full compression by providing an upper mounting assembly adaptable for a vehicle having a reduced hood line without changing the suspension characteristics of the vehicle.

It is another feature of one form the present invention to provide a vehicle shock absorber strut upper mounting assembly wherein a convoluted jounce bumper is adapted to additionally function as a dust and splash shield.

Still another object of the present invention is to provide an upper seat mounting assembly for a shock absorber strut wherein both an elastomer isolator and a jounce bumper provide elastic cushioning while positive compression travel stops prevent excessive deformation or overloading of both the isolator and jounce bumper thereby increasing the service life of the mounting assembly.

BRIEF DESCRIPTION OF THE DRAWINGS

These and other objects, features and advantages of the invention will be apparent from the following specification and from the drawings wherein.

DETAILED DESCRIPTION OF THE INVENTION

Figure 1:
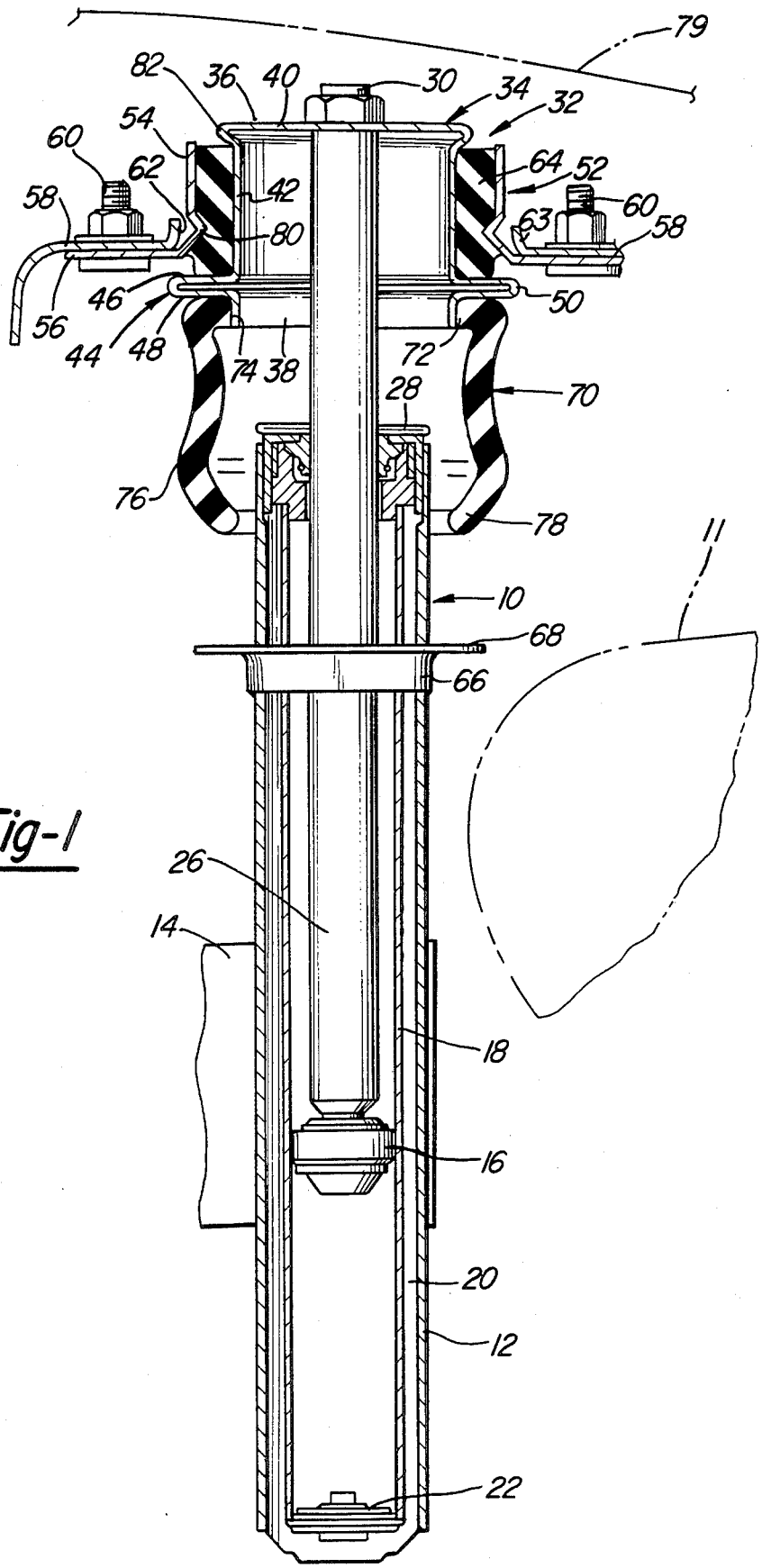
FIG. 1 is a front view in partial cross-section of a suspension strut according to the present invention.

Referring now to FIG. 1, there is shown a portion of the front suspension of a vehicle wheel incorporating a shock absorbing suspension strut 10 interconnecting the vehicle body and front wheel 11. The strut 10 has an outer reservoir support casing 12 supported at its lower end in a mounting bracket partially indicated at 14. This mounting bracket 14 is attached to a steering knuckle (not shown) of a steerable front road wheel assembly driven by a rotatable axial (not shown). Reference may be had to U.S. Pat. No. 4,377,298 issued Mar. 22, 1983 to Finn et al. to show a typical vehicle wheel suspension strut connected to a steering knuckle of a steerable front road wheel assembly.

Secured within the reservoir support casing 12 is a hydraulic shock absorbing cartridge having a valved piston 16 mounted for reciprocating sliding movement in cylinder tube 18 radially spaced inwardly from the support casing 12 to provide a reservoir 20 for the hydraulic dampening fluid of the strut. A base valve 22 provides for controlled hydraulic communication between the reservoir 20 and variable volume compression chamber 24 formed by the reciprocating piston and the cylinder tube 18. The piston 16 is connected to the lower end of a cylindrical piston rod 26 which extends axially and upwardly through an end cap 28 fastened to the upper end of the support casing 12.

The piston rod 26 has a reduced diameter and threaded upper end 30 attached to a strut upper mounting assembly 32. The assembly 32 comprises an inverted cylindrical cup 34 having an upper closed end hollow body portion 36 and a lower open end neck portion 38. The cup body portion 36 comprises a generally horizontally disposed upper closed end 40 and a cylindrical side wall portion 42. The cylindrical neck portion 38 is joined to the body side wall portion 42 by radial stop flange means. In the preferred embodiment, the stop flange means is in the form of integral reverse-bend radially outwardly extending annular stop flange 44. It will be noted that the reverse-bend stop flange 44 comprises upper 46 and lower 48 parallel flange portions, respectively, disposed in vertically spaced parallel relation and joined by a continuous radiused outer edge portion 50.

A collar member generally indicated at 52, includes a cylindrical collar portion 54 surrounding the cup side wall body portion 42 in a concentric manner defining an annular space therebetween. The collar member 52 has an integral radially outwardly extending mounting flange portion 56 formed at its lower end. The collar mounting flange portion 56 is removably fixed to a vehicle body strut receiving sheet metal panel or tower 58, as by bolts 60, upon the strut mount assembly 32 being positioned in panel circular opening 62. The opening 62 is defined by annular raised lip 63 extending upwardly from the panel 58.

A resilient cylindrical isolator 64, molded of suitable deformable or elastomeric material such as natural or synthetic rubber, is fitted in the annular space and bonded as by vulcanization or other known bonding means to the outer upstanding collar portion 54 and the inner inverted cup side wall portion 42. In this way the cup 34 and collar member 52 are resiliently interconnected to absorb shock in a manner to be explained. It will be noted that a circular bushing 66 is suitably affixed to the support casing 12 as by welding. A radial contact ring portion 68 of the bushing is positioned a predetermined distance below the upper end cap 28 of the support casing.

An elastomeric convoluted sleeve, generally indicated at 70, extends a predetermined axial distance sufficient to surround the upper end of the support casing 12 and the exposed intermediate portion of the piston rod 26 with the strut in its neutral or staticly loaded position. The convoluted sleeve 70 upper end is formed with an integral inner radial lip portion 72 encircling the cup neck portion 38 with its inner annular periphery 74 suitably affixed to the neck portion 38 as by bonding. An outwardly bowed concavo-convex shaped single convolute portion 76 is formed intermediate the upper and lower ends of the sleeve. It will be appreciated that the convoluted sleeve 70 could be formed with one or more convolute portions 76 without departing from the scope of the invention.

Figure 2:
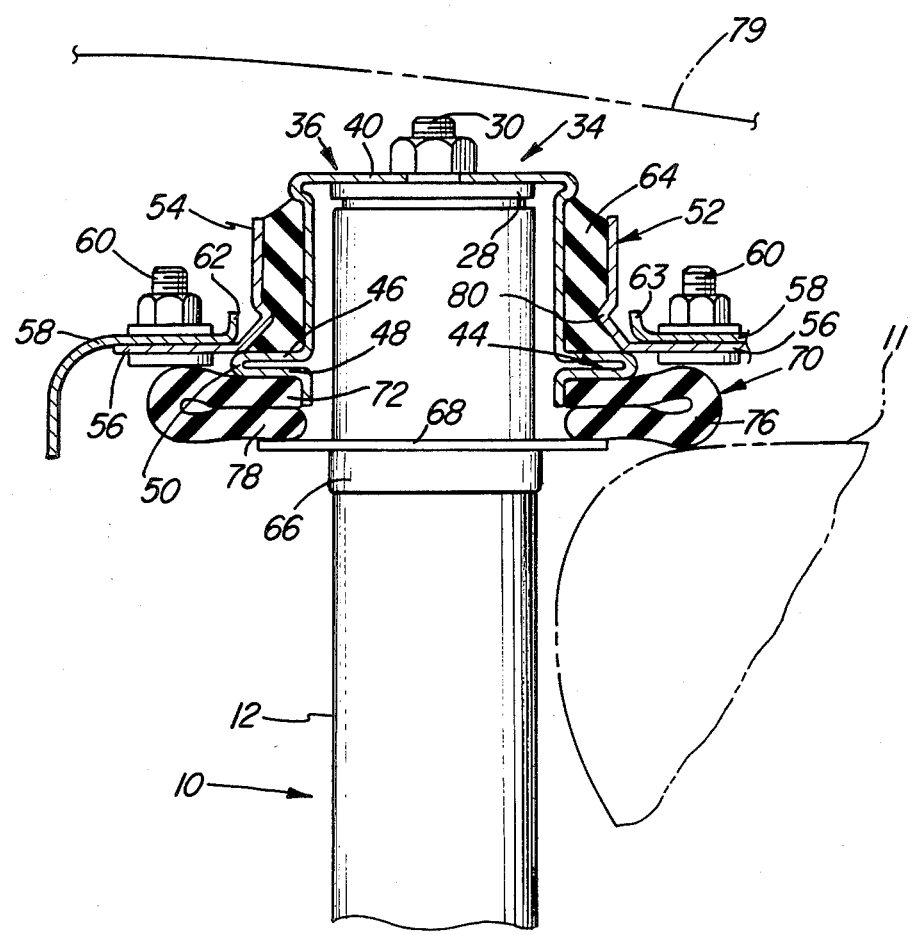
FIG. 2 is a view similar to FIG. 1 wherein the strut is shown in its maximum jounce position such that the inverted cup-shaped member radial stop flange abuts the collar radial flange.

The cup body and neck portions 42 and 72 are of a predetermined diameter and axial extent to telescopically receive therein a predetermined portion of the upper end of the support casing 12 during wheel jounce and rebound shock as seen in FIG. 2. As the suspension travel increases, however, the support casing contact ring 68 will contact the lower inturned end 78 of the sleeve 70. This causes the sleeve 70 to yield until it folds outwardly upon its convolute portion 65 so that it is initially loaded between the contact ring 68 and the cup stop flange 44 as seen in FIG. 2. During maximum jounce travel the folded convoluted sleeve is compressed by the contact ring 68 against the stop flange 44 while the elastomeric isolator 64 deforms in an upward axial direction. In the event the isolator 64 is subjected to a large deforming shock the stop flange 44 abuts the collar mounting flange portion 56 limiting the upward movement of the cup 34. As a result the strut and cup 34 are allowed a predetermined amount of free dampened travel relative to the collar member 52 while preventing the isolator from being excessively deformed thereby increasing the isolator's service life. In a similar manner the support casing upper end 28 is designed to contact the cup upper end cap 40 limiting the upward travel of the strut 10 preventing overtravel and thus possible damage to the base valve of the shock absorber. This predetermined jounce travel also prevents excessive deformation of the convoluted sleeve 70 and thereby extending its service life. It will thus be seen that in the embodiment of FIGS. 1 and 2 convoluted sleeve 70 provides dual functions in that it serves as both a dust shield and a jounce bumper.

As a result of applicant's improved compact upper mount arrangement, the strut support casing is permitted full suspension jounce travel within the strut mounting cup to effectively absorb shocks. Thus, the mount is readily adaptable for vehicles having a low profile hood line, indicated by dashed line 79 in FIG. 1.

It will be appreciated that the convoluted sleeve 70 functions as a dust or splash shield by normally extending axially so as to surround in a closely adjacent manner the support tube upper end and the exposed portion of the piston rod 26. In FIG. 2 it will be seen that even during large deforming shocks the support casing contact ring 68, by virtue of its sealing engagement with the jounce bumper lower end, provides an effective barrier to keep moisture and dust from decreasing the service life of the strut.

In FIGS. 1 and 2 the collar portion 54 lower end is formed with a continuous annular crease 80 extending radially inwardly into the outer surface of the isolator 64. The annular V-crease 80 is sized such that in combination with outwardly directed peripheral rim portion 82 of the cup, it prevents the cup 34 from being separated from the collar member 52.

Figure 3:
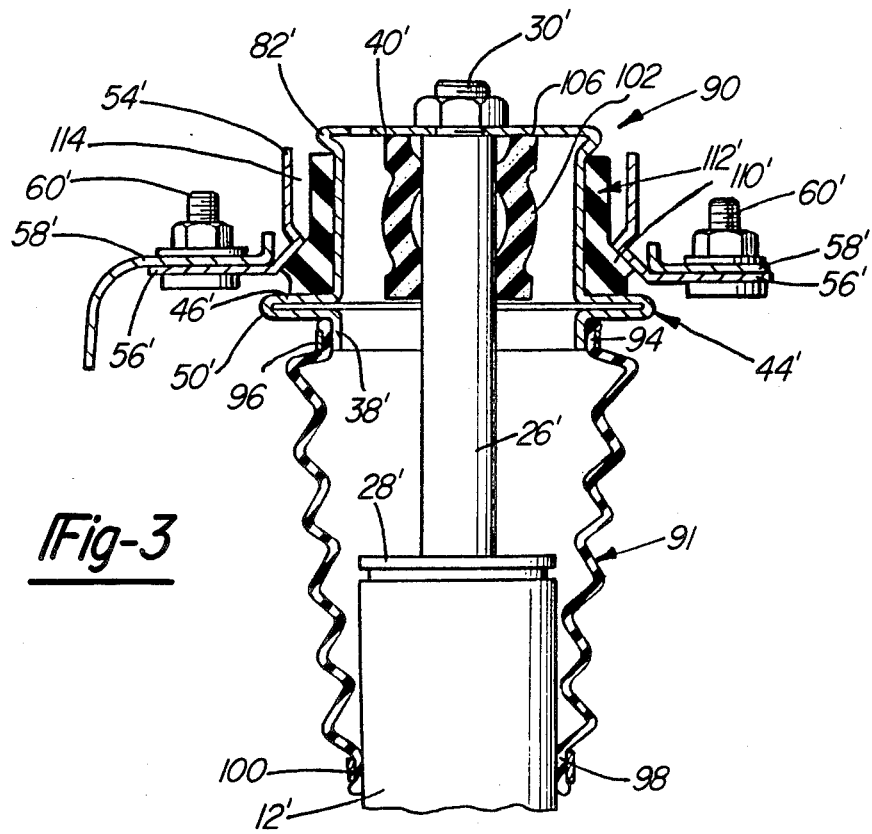
FIG. 3 is a view similar to FIG. 1 showing a modified embodiment of the suspension strut of the present invention.
Figure 4:
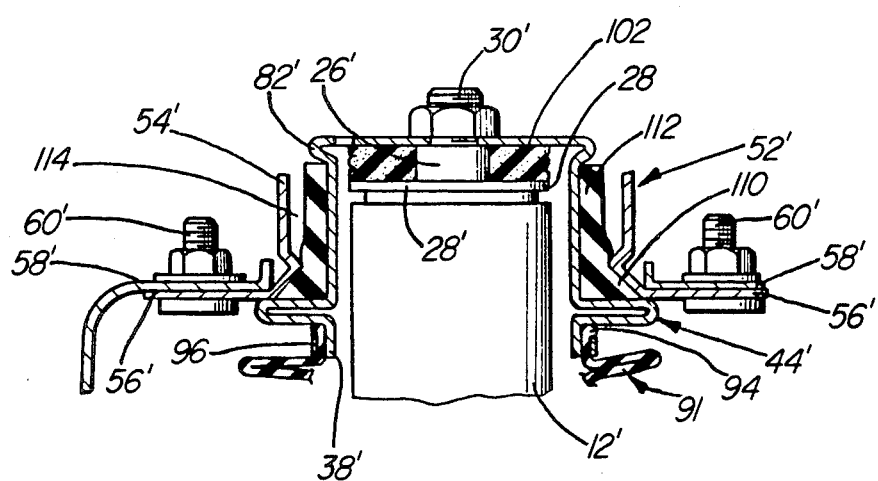
FIG. 4 is a view similar to FIG. 3 wherein the strut is shown in its maximum compressed condition.

In FIGS. 3 and 4 there is shown an alternative embodiment of the present invention. With respect to the portions of the structure shown in FIGS. 3 and 4 that are identical to the embodiment of FIGS. 1 and 2 like or similar parts have been given the same numerals except that they have been primed.

FIG. 3 shows a strut upper mounting assembly 90 having a convoluted protective elastomeric boot or shield generally indicated at 91. The shield has an upper large diameter end 94 fixed to the cup neck portion 38' by means of a retaining band 96. Similarly its lower small diameter end 98 is fixed to the support casing 12' by means of a retaining band 100.

An elastomeric jounce bumper hollow convoluted tube member 102 has an internal bore 104 sized for sliding reception on the upper end of the piston rod 26'. The tube member 102, having a predetermined diameter and length, is formed from resiliently compressible plastic foam material such as urethane. The convoluted tube member 102 has its upper end face 106 bonded to the inner surface of the cup closed end 40. By virtue this arrangement, abutment of the cup member stop flange 44' with the collar flange 56' will prevent both the isolator 110 and the jounce bumper convoluted tube member 102 from being overstressed at full jounce travel.

It will be noted in FIG. 3 that the isolator 110 is formed with a reduced cylindrical upper section 112 of predetermined thickness and height defining an annular clearance 114 with the collar portion 54'. The purpose of the clearance 114 is to reduce or control the conical (tilting) stiffness of the isolator. The tilting or conical stiffness is a function of the radial stiffness and the height of the isolator 110. Thus, the size of the isolator clearance 114 controls flexibility in torsion or tilt of the strut upper mount 90.

While only two embodiments of this invention have been described those skilled in the art will appreciate that other forms may be possible without departing from the scope of the following claims.

What is claimed is:

1. A telescoping shock absorbing suspension strut operatively connected between sprung and unsprung masses of a vehicle having an outer support casing operatively connected to said unsprung mass of said vehicle and an inner cylinder tube fixed in said support casing having a hydraulic dampening fluid therein, a valved piston mounted for sliding reciprocal movement in said inner cylinder tube, a piston rod operatively connected to said piston with its upper end extending through one upper end of said cylinder tube and said support casing, a mounting assembly for said strut adapted for attachment to a horizontally disposed strut receiving said sprung mass, said mounting assembly comprising; a collar member including an annular upstanding cylindrical-shaped collar portion having a free upper end and a lower end formed end with an integral, radially outwardly extending horizontally disposed mounting flange portion underlying said vehicle sprung mass panel and secured thereto, an inverted cup having a right cylindrical body portion formed with an upper closed end portion and a lower open end neck portion, said cup body portion positioned in a concentrically spaced manner within said collar member defining a uniform annular space therebetween such that said cup upper closed end portion is located above said collar member upper end, said cup body and neck portions joined by a radially outwardly extending annular stop flange formed a predetermined axial distance above said neck portion open end, said cup stop flange spaced a predetermined axial distance below the plane of said collar mounting flange portion, said stop flange having a predetermined radial extent so as to be vertically aligned for flush abutting contact with said collar mounting flange portion when said strut undergoes maximum jounce, a right cylindrical-shaped elastomeric isolator fitted in said annular space and bonded to both said outer collar portion and said inner cup body portion, said isolator having a uniform thickness and extending vertically below said space such that its lower end contacts the upper surface of said stop flange, a sleeve-shaped elastomeric shield having one or more convoluted portions formed intermediate its upper and lower ends, said shield encircling the upper end portion of said support casing, said shield having on its upper end bonded to the exterior surface said neck portion, a radially outwardly extending contact flange positioned on said support casing a predetermined axial distance below its upper end, said piston rod extending upwardly into said cup in a co-axial manner with its upper end fixed to said cup closed end, said cup having a predetermined internal diameter whereby upon movement of said sprung and unsprung masses toward one another said support casing upper end adapted to be telescopically received in said cup body portion, wherein said cup stop flange adapted for flush abutting contact with said collar mounting flange portion upon said strut undergoing maximum jounce travel without causing excessive stress on said elastomeric isolator, and such that said shield one or more convolute portions being initially progressively buckled and compressed between said cup stop flange and said casing contact flange, and whereby during said maximum jounce travel said support casing upper end is adapted to contact said cup closed end obviating excessive deformation of said elastomeric shield.

2. The telescoping shock absorbing suspension strut assembly as set forth in claim 1, wherein said cup stop flange is in the form of an integral reverse-bend flange comprising upper and lower parallel flange portions, respectively, disposed in vertically spaced parallel relation, and said flange portions integrally joined by a continuous outer edge portion.

* * * * *

UNITED STATES PATENT AND TRADEMARK OFFICE
CERTIFICATE OF CORRECTION

PATENT NO. : 4,747,587
DATED : May 31, 1988
INVENTOR(S) : Farrell

It is certified that error appears in the above-identified patent and that said Letters Patent are hereby corrected as shown below:

Column 1, item 19, omit "Ferrel" and insert --Farrell--; item 75, omit "Ferrel" and insert --Farrell--.

Signed and Sealed this

Fifteenth Day of November, 1988

Attest:

DONALD J. QUIGG

*Attesting Officer*   *Commissioner of Patents and Trademarks*